W. Tetro,
Cant Hook.

No. 110,309. Patented Dec. 20, 1870.

Witnesses,
James G. Kirk
C. A. Shepard

Inventor,
Waldy Tetro,
by James Shepard Atty

United States Patent Office.

WALDY TETRO, OF NORTHAMPTON, MASSACHUSETTS, ASSIGNOR TO UNION NUT COMPANY, OF UNIONVILLE, CONNECTICUT.

Letters Patent No. 110,309, dated December 20, 1870.

IMPROVEMENT IN CANT-HOOKS.

The Schedule referred to in these Letters Patent and making part of the same.

I, WALDY TETRO, of Northampton, in the county of Hampshire and State of Massachusetts, have invented a new and improved Combined Crow-bar and Cant-Hook, of which the following is a specification.

My invention consists of the employment of a hook, pivoted to a socket or sleeve, corresponding in shape to the lower part of an ordinary crow-bar, whereby it can be readily attached to said crow-bar for use as a cant-hook, as hereinafter described.

In the accompanying drawing—

Figure 1:
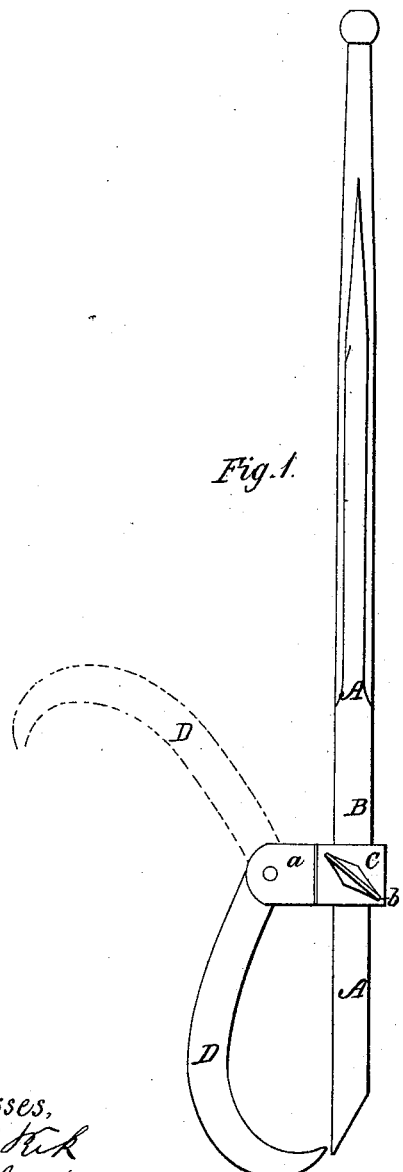
Figure 1 is a side elevation of a bar and hook of my invention.
Figure 2:
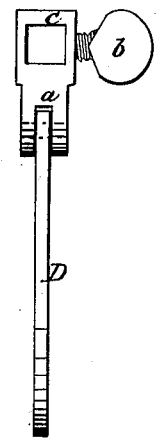
Figure 2 is a top view of the hook detached from the bar.

A designates an iron bar, pointed in any desired form, so as to be used for any style of crow-bar.

A portion, B, of the bar A is squared, as is generally the case with the ordinary crow-bar.

C designates a socket or sleeve, of a proper size to fit the squared portion B of the bar A.

An arm, $a$, projects from the socket C, to which arm is pivoted the hook D.

A set-screw, $b$, secures the socket C upon the bar A, in any desired position, whereby the distance between the point of the bar and the hook can be increased or diminished by raising or lowering the socket C upon the bar A, thus adjusting the device so as to gripe objects of different sizes.

The whole device, thus arranged, is used as an ordinary cant-hook for turning or moving heavy articles. When desired to use the bar for a crow-bar, the set-screw $b$ can be loosened, and the socket and hook removed.

I claim as my invention—

The combination of an ordinary iron crow-bar A, adjustable and removable socket-sleeve C, and the hook D, the whole combined and operating together, substantially as and for the purpose described.

WALDY TETRO.

Witnesses:
    E. M. MILLS,
    W. W. PINNEY.